UNITED STATES PATENT OFFICE.

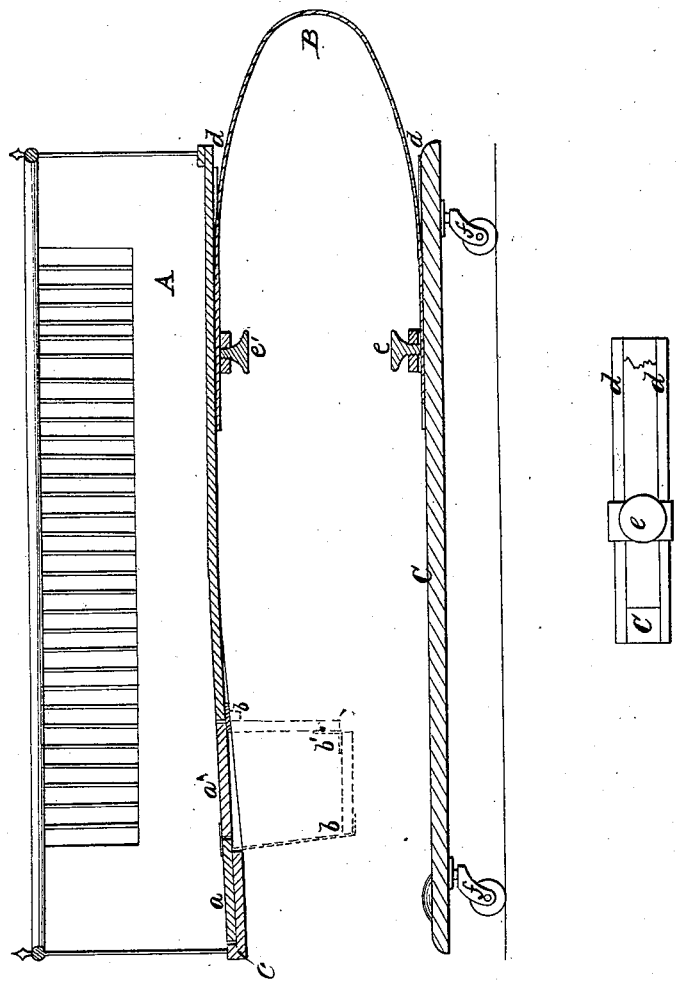

GEORGE H. MELLEN, OF CHICAGO, ILLINOIS.

COMBINED BABY-JUMPER AND CRADLE.

Specification forming part of Letters Patent No. 79,534, dated June 30, 1868.

*To all whom it may concern:*

Be it known that I, GEORGE H. MELLEN, of Chicago, Cook, county, State of Illinois, have invented a new and Improved Baby-Jumper and Cradle Combined; and I do hereby declare that the following is a full and exact description thereof, reference being had to the accompanying drawings, and to the letters of reference marked thereon.

The nature of my invention consists in a combined baby-jumper, cradle, and movable stand on casters or wheels.

To enable others skilled in the art to make and use my invention, I will proceed to describe its construction and operation.

I take a common cradle, A, with a bottom of wood, $a$, or other material, provided with an opening, $a$ $a'$, at the upper end, which is made to turn down, with cloth or other hinges $b$ $b'$, which forms a seat for the infant, and foot-rest. This can be readjusted and fastened by means of a catch or other device, $c$, so as to make the bottom of the cradle firm, and fit to put a small bed upon. To this is adjusted a spring or springs, B, fastened by means of grooved plates $d$ $d'$, provided with set-screws $e$ $e'$ and slides, by which the spring or springs can be made more or less pliable, and can be adjusted to any degree of tension. The lower or under part or end of the spring B is attached to the grooved plate $d$ $d$ by means of a plate screwed or fastened onto the platform C, which is made easily movable by means of casters or wheels $f$ $f'$, so as to propel the child round a room, &c.

Having thus described my invention, what I claim, and desire to secure by Letters Patent, is—

1. The cradle A, provided with the openings in the bottom $a$ $a'$, made substantially in the manner and form and for the purposes described.

2. The cradle A, provided with openings in the bottom $a$ $a'$, in combination with the adjustable slides $e$ $e'$ and spring or springs B, constructed and made in the manner and form and for the purposes described.

3. The cradle A and openings $a$ $a'$, combined with the slides and adjustable spring or springs B and movable platform C, constructed and made in the manner and form and for the purposes described.

GEO. H. MELLEN.

Witnesses:
J. F. OVERBAUGH,
W. N. WALTON.